US 9,002,973 B2

(12) United States Patent
Panther

(10) Patent No.: US 9,002,973 B2
(45) Date of Patent: Apr. 7, 2015

(54) DELAYED PUBLISHING IN PROCESS CONTROL SYSTEMS

(71) Applicant: Fisher Controls International LLC, Marshalltown, IA (US)

(72) Inventor: Mitchell Stephen Panther, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 262 days.

(21) Appl. No.: 13/653,489

(22) Filed: Oct. 17, 2012

(65) Prior Publication Data

US 2013/0103780 A1    Apr. 25, 2013

Related U.S. Application Data

(60) Provisional application No. 61/549,982, filed on Oct. 21, 2011.

(51) Int. Cl.
*G06F 15/16* (2006.01)
*H04L 29/08* (2006.01)

(52) U.S. Cl.
CPC .............. *H04L 67/325* (2013.01); *H04L 67/12* (2013.01); *H04L 67/2842* (2013.01)

(58) Field of Classification Search
CPC ............. H04J 1/00; H04J 3/00; H04W 56/00; H04W 74/00
USPC ................... 709/210, 211, 212, 213
See application file for complete search history.

(56) References Cited

U.S. PATENT DOCUMENTS

| 6,424,872 | B1 | 7/2002 | Glanzer et al. |
| 7,593,605 | B2* | 9/2009 | King et al. ................. 382/313 |
| 8,270,410 | B2* | 9/2012 | Rogers et al. ............ 370/395.21 |
| 2005/0049945 | A1* | 3/2005 | Bourbonnais et al. .......... 705/30 |
| 2005/0113650 | A1* | 5/2005 | Pacione et al. ................. 600/300 |
| 2008/0273518 | A1* | 11/2008 | Pratt et al. ..................... 370/345 |
| 2009/0059814 | A1 | 3/2009 | Nixon et al. |

FOREIGN PATENT DOCUMENTS

WO    WO-98/14851 A1    4/1998

OTHER PUBLICATIONS

"Delayed Open Access—An Overlooked high-impact category of openly available scientific literature"—Laakso et al, Open Access Publishing Org., Apr. 2012 http://www.openaccesspublishing.org/delayed/laakso_bj_rk_delay_preprint.pdf.*

(Continued)

*Primary Examiner* — Randy Scott
(74) *Attorney, Agent, or Firm* — Marshall, Gerstein & Borun LLP

(57) ABSTRACT

Techniques for delaying the publication of data to a network by a device in a process control system or plant include obtaining, at the device, data to be published to the network; storing the obtained data and a corresponding timestamp in a cache; triggering a publication of cached data; and, based on the trigger, publishing the oldest cached data to the network during the publishing timeslot assigned to the device. The cached data may correspond to a sample rate of the device and may include multiple instances of data obtained over time. The device includes a network interface, a cache, and a publisher, and the device may be configured to operate in the delayed publishing mode, or to operate in an immediate publishing mode in which currently obtained data that has not been cached is published to the network during the publishing time slot assigned to the device.

30 Claims, 8 Drawing Sheets

(56) References Cited

OTHER PUBLICATIONS

Thomesse J.P., "Fieldbus Technology in Industrial Automation," Proceedings of the IEEE, vol. 93, No. 6, 2005.

International Search Report for PCT/US2012/061287, mailed May 29, 2013.
Written Opinion for PCT/US2012/061287, mailed May 29, 2013.

* cited by examiner

DELAYED PUBLISHING IN PROCESS CONTROL SYSTEMS

CROSS REFERENCE TO RELATED APPLICATIONS

This application claims the benefit of U.S. Provisional Application No. 61/549,982, entitled "Delayed Publishing in Process Control Systems" which was filed on Oct. 21, 2011, the entire disclosure of which is hereby incorporated by reference herein.

FIELD OF TECHNOLOGY

The present invention relates generally to publishing data or events in process control networks or systems and, more particularly, to delaying the publishing of data or events by a network device in a process control network.

BACKGROUND

Currently known network devices included in a process control network are allocated publishing opportunities to send or publish process control data to the network. During an allocated publishing opportunity, a network device determines a current value of process control data and sends or publishes the current value to the network.

DETAILED DESCRIPTION OF THE DRAWINGS

DETAILED DESCRIPTION

Figure 1:
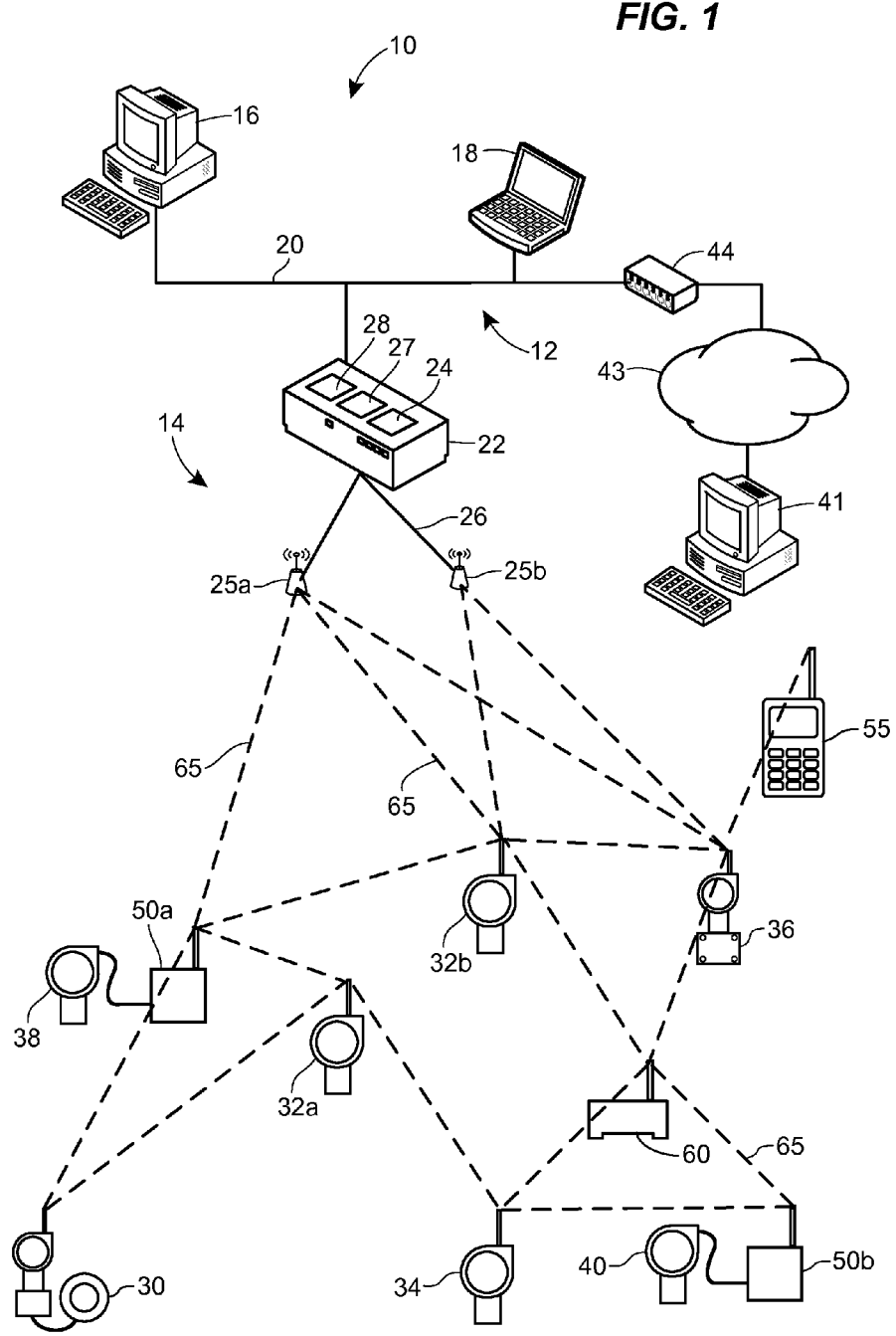
FIG. 1 is a block diagram that illustrates a system utilizing a wireless HART network to provide wireless communication between field and router devices, which are connected to a plant automation network via a gateway device.

FIG. 1 illustrates an exemplary process control network 10 in which the delayed publishing techniques described herein may be incorporated. In an embodiment, the process control network 10 is included in a process plant, such as a petroleum, chemical and/or other type of industrial process plant, and the process control network 10 controls one or more processes executed by the process plant. In particular, the network 10 may include a plant automation network 12 and a communications network 14. In the embodiment of the process control network 10 shown in FIG. 1, the communications network 14 is illustrated as a communications network that supports a wireless HART (Highway Addressable Remote Transducer) protocol, e.g., a "wireless HART network." In some embodiments of the network 10, however, the communications network 14 may support a wired HART protocol, e.g., a "wired HART network." In some embodiments, both a wired and a wireless HART network 14 may be included in the network 10.

The plant automation network 12 may include one or more stationary workstations 16 and one or more portable workstations 18 connected over a communication backbone 20. The backbone 20 may be implemented over Ethernet, RS-485, Profibus DP or other suitable communication protocol. The plant automation network 12 and the wireless HART network 14 may be connected via a gateway 22. Specifically, the gateway 22 may be connected to the backbone 20 in a wired manner and may communicate with the plant automation network 12 by using any suitable known protocol. The gateway 22 may be implemented as a standalone device, as a card insertable into an expansion slot of the hosts or workstations 16 or 18, or as part of the IO subsystem of a PLC-based or DCS-based system, or in any other manner. The gateway 22 may provide, to applications running on the network 12, access to various network devices of the wireless HART network 14. In addition to protocol and command conversion, the gateway 22 may provide synchronized clocking used by time slots and superframes (sets of communication time slots spaced equally in time) of the scheduling scheme of the wireless HART network 14.

In some situations, networks may have more than one gateway 22. These multiple gateways can be used to improve the effective throughput and reliability of the network by providing additional bandwidth for the communication between the wireless HART network and the plant automation network 12 or the outside world. On the other hand, the gateway 22 device may request bandwidth from the appropriate network service according to the gateway communication needs within the wireless HART network. The gateway 22 may further reassess the necessary bandwidth while the system is operational. For example, the gateway 22 may receive a request from a host residing outside the wireless HART network 14 to retrieve a large amount of data. The gateway device 22 may then request additional bandwidth from a dedicated service such as a network manager in order to accommodate this transaction. The gateway 22 may then request the release of the unnecessary bandwidth upon completion of the transaction.

In some embodiments, the gateway 22 is functionally divided into a virtual gateway 24 and one or more network access points 25a, 25b. Network access points 25a, 25b may be separate physical devices in wired communication with the gateway 22 in order to increase the bandwidth and the overall reliability of the wireless HART network 14. However, while FIG. 1 illustrates a wired connection 26 between the physically separate gateway 22 and access points 25a, 25b, it will be understood that the elements 22-26 may also be provided as an integral device. Because network access points 25a, 25b may be physically separate from the gateway device 22, each of the access points 25a, 25b may be strategically placed in several distinct locations. In addition to increasing the bandwidth, the multiple access points 25a, 25b can increase the overall reliability of the network by compensating for a potentially poor signal quality at one access point at one or more other access points. Having multiple access points 25a, 25b also provides redundancy in case of failure at one or more of the access points 25a, 25b.

The gateway device 22 may additionally contain a network manager software module 27 and a security manager software module 28. In another embodiment, the network manager 27 and/or the security manager 28 may run on one of the hosts on the plant automation network 12. For example, the network manager 27 may run on the host 16 and the security manager 28 may run on the host 18. The network manager 27 may be responsible for configuration of the network 14, scheduling communications between devices included in the network 14 such as wireless HART devices (i.e., configuring superframes), management of the routing tables and monitoring and reporting the health of the wireless HART network 14. While redundant network managers 27 are supported, it is contemplated that there should be only one active network manager 27 per wireless HART network 14. In one possible embodiment, the network manager 27 analyzes the information regarding the layout of the network, the capability and update rate of each network device, and other relevant information. The network manager 27 may then define routes and schedules of communications to, from and between network devices in view of these factors.

Referring again to FIG. 1, the wireless HART network 14 may include one or more field devices 30-40. In general, process control systems, like those used in chemical, petroleum or other process plants, include such field devices as valves, valve positioners, switches, sensors (e.g., temperature, pressure and flow rate sensors), pumps, fans, etc. Field devices may perform process control functions within a process that is controlled by the process control network 10. A process control function may include, for example, opening or closing valves and/or monitoring or taking measurements of process parameters. In the wireless HART communication network 14, field devices 30-40 are producers and consumers of wireless HART packets.

An external host 41 may be connected to a network 43 which, in turn, may be connected to the plant automation network 12 via a router 44. The network 43 may be, for example, the World Wide Web (WWW). Although the external host 41 does not belong to either the plant automation network 12 or the wireless HART network 14, the external host 41 may access devices on both networks via the router 44.

The wireless HART network 14 may use a protocol which provides similar operational performance that is experienced with wired HART devices. The applications of this protocol may include process data monitoring, critical data monitoring (with the more stringent performance requirements), calibration, device status and diagnostic monitoring, field device troubleshooting, commissioning, and supervisory process control. These applications require that the wireless HART network 14 use a protocol which can provide fast updates when necessary, move large amounts of data when required, and support network devices which join the wireless HART network 14 only temporarily for commissioning and maintenance work.

In one embodiment, the wireless protocol supporting network devices of the wireless HART network 14 is an extension of HART, a widely accepted industry standard that maintains the simple workflow and practices of the wired environment. The wireless HART protocol may be used to establish a wireless communication standard for process applications and may further extend the application of HART communications and the benefits it provides to industry by enhancing the HART technology to support wireless process automation applications.

Referring again to FIG. 1, field devices 30-36 may be wireless HART devices. In other words, a field device 30, 32a, 32b, 34, or 36 may be provided as an integral unit supporting all layers of the wireless HART protocol stack. In the network 10, the field device 30 may be a wireless HART flow meter, the field devices 32a, 32b may be wireless HART pressure sensors, the field device 34 may be a wireless HART valve positioner, and the field device 36 may a wireless HART pressure sensor. Importantly, wireless HART devices 30-36 are HART devices supporting all that users have come to expect from the wired HART protocol. As one of ordinary skill in the art will appreciate, one of the core strengths of the HART protocol is its rigorous interoperability requirements. In some embodiments, all wireless HART equipment includes core mandatory capabilities in order to allow equivalent device types to be exchanged without compromising system operation. Furthermore, the wireless HART protocol is backward compatible to HART core technology such as the device description language (DDL). In the preferred embodiment, all HART devices (wired or wireless) should support the DDL, which ensures that end users immediately have the tools to begin utilizing the wireless HART protocol.

On the other hand, a field device 38 may be a legacy 4-20 mA device and a field device 40 may be a wired HART device. Field devices 38 and 40 may be connected to the wireless HART network 14 via respective wireless HART adaptors (WHA) 50a, 50b. Additionally, the WHAs 50a, 50b may support other communication protocols such as Foundation Fieldbus, PROFIBUS, DevicesNet, etc. In these embodiments, the WHAs 50a, 50b support protocol translation on a lower layer of the protocol stack. Additionally, it is contemplated that a single WHA 50a or 50b may also function as a multiplexer and may support multiple HART or non-HART devices.

Plant personnel may additionally use handheld devices for installation, control, monitoring, and maintenance of network devices. Generally speaking, handheld devices may be portable equipment that can connect directly to the wireless HART network 14 or through the gateway 22 as a host on the plant automation network 12. As illustrated in FIG. 1, a wireless HART-connected handheld device 55 may communicate directly to the wireless HART network 14. When operating with a formed wireless HART network 14, this handheld device 55 may join the network 14 as just another wireless HART field device. When operating with a target network device that is not connected to a wireless HART network, the handheld device 55 may operate as a combination of the gateway device 22 and the network manager 27 by forming its own wireless HART network with the target network device.

A plant automation network-connected handheld device (not shown) connects to the plant automation network 12 through known networking technology, such as Wi-Fi. This device talks to the network devices 30-40 through the gateway device 22 in the same fashion as external plant automation servers (not shown) or the workstations 16 and 18.

Additionally, the wireless HART network 14 may include a router device 60. The router device 60 may be a network device that forwards packets from one network device to another. A network device that is acting as a router device may use internal routing tables to decide to which network device it should forward a particular packet. Stand alone routers such as the router 60 may not be required in those embodiments where all devices on the wireless HART network 14 support routing. However, it may be beneficial (e.g. to extend the network, or to save the power of a field device in the network) to add a dedicated router 60 to the network.

All devices directly connected to the wireless HART network 14 may be referred to as network devices. In particular, the wireless HART field devices 30-36, the adaptors 50a, 50b, the routers 60, the gateway 22, the access points 25a, 25b, and the wireless HART-connected handheld device 55 are, for the purposes of routing and scheduling, the network devices or the nodes of the wireless HART network 14. In order to provide a very robust and an easily expandable network, it is contemplated that all network devices may support routing and each network device may be globally identified by its HART address. The network manager 27 may contain a complete list of network devices and assign each device a short, network unique 16-bit nickname. Additionally, each network device may store information related to update rates, connections sessions, and device resources. In short, each network device maintains up-to-date information related to routing and scheduling. The network manager 27 communicates this information to network devices whenever new devices join the network or whenever the network manager detects or originates a change in topology or scheduling of the wireless HART network 14.

Further, each network device may store and maintain a list of neighbor devices that the network device has identified during the listening operations. Generally speaking, a neighbor of a network device is another network device of any type potentially capable of establishing a connection with the network device in accordance with the standards imposed by a corresponding network. In case of the wireless HART network 14, the connection is a wireless connection. However, it will be appreciated that a neighboring device may also be a network device connected to the particular device in a wired manner. As will be discussed later, network devices promote their discovery by other network devices through advertisement, or special messages sent out during the designated timeslots. Network devices operatively connected to the wireless HART network 14 have one or more neighbors which they may choose according to the strength of the advertising signal or to some other principle.

Referring again to FIG. 1, in a pair of network devices connected by a direct wireless connection 65, each device recognizes the other as a neighbor. Thus, network devices of the wireless HART network 14 may form a large number of connections 65. The possibility and desirability of establishing a direct wireless connection 65 between two network devices is determined by several factors such as the physical distance between the nodes, obstacles between the nodes, signal strength at each of the two nodes, etc. Further, two or more direct wireless connections 65 may form paths between nodes that cannot form a direct wireless connection 65. For example, the direct wireless connection 65 between the wireless HART hand-held device 55 and wireless HART device 36 along with the second direct wireless connection 65 between the wireless HART device 36 the router 60 form a communication path between devices 55 and 60.

Each wireless connection 65 is characterized by a large set of parameters related to the frequency of transmission, the method of access to the radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (2.4 GHz). While the system and method discussed herein may be applied to a wireless network operating on any designated frequency or range of frequencies, the embodiment discussed below relates to the wireless HART network 14 operating in the unlicensed or shared part of the radio spectrum. In accordance with this embodiment, the wireless HART network 14 may be easily activated and adjusted to operate in a particular unlicensed frequency range as needed.

Figure 2:
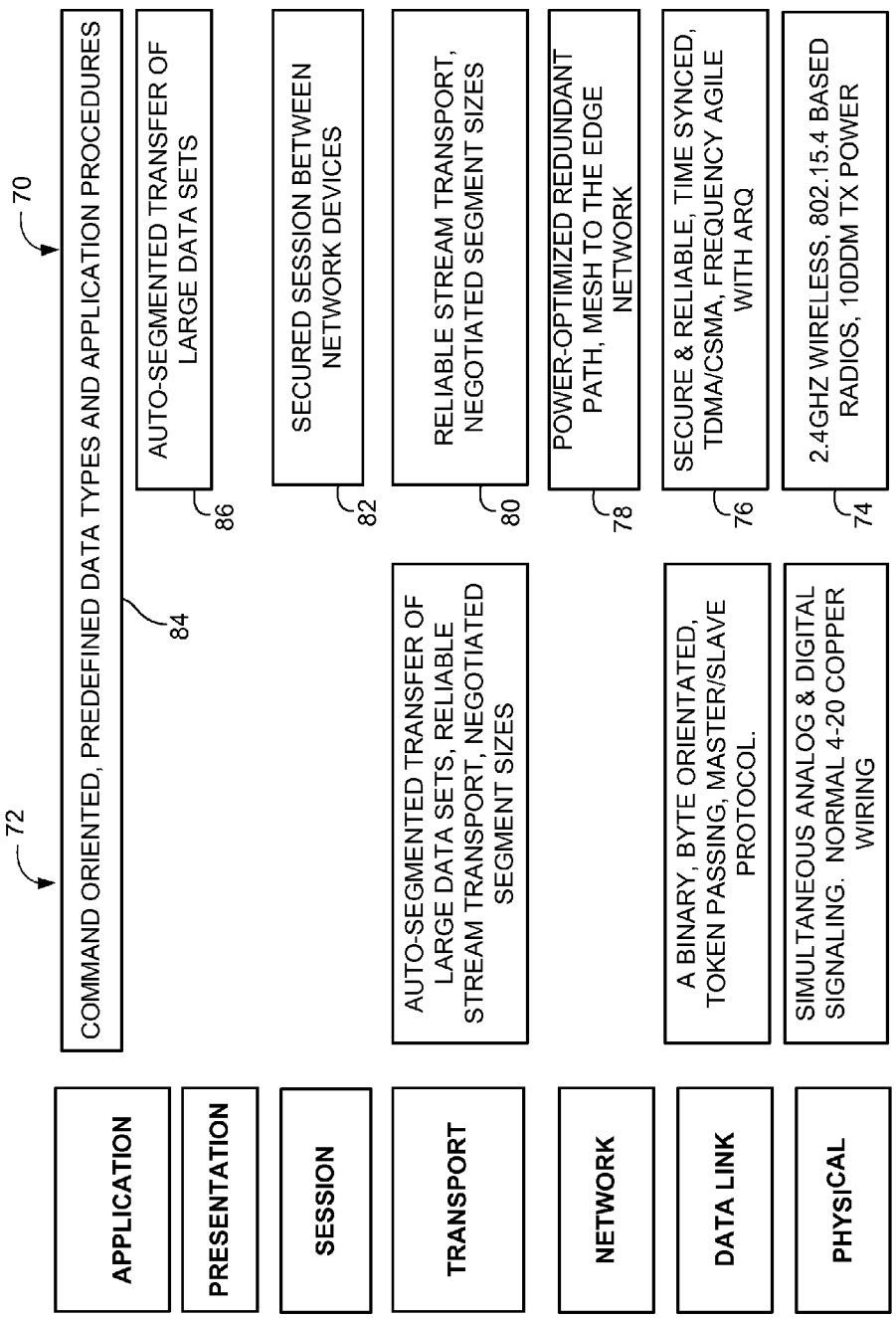
FIG. 2 is a schematic representation of the layers of a wireless HART protocol implemented in accordance with one of the embodiments discussed herein.

Turning to FIG. 2, in an embodiment, the protocol supporting the wireless HART network 14 is a wireless HART protocol 70. More specifically, each of the direct wireless connections 65 may transfer data according to the physical and logical requirements of the wireless HART protocol 70. FIG. 2 schematically illustrates the structure of one of the embodiments of the protocol 70 and of the existing "wired" HART protocol 72. The wireless HART protocol 70 may be a secure, wireless mesh networking technology operating in the 2.4 GHz ISM radio band (block 74). In one embodiment, the wireless HART protocol 70 may utilize IEEE 802.15.4b compatible direct sequence spread spectrum (DSSS) radios with channel hopping on a transaction by transaction basis. This wireless HART communication may be arbitrated using time division multiple access or Time Division Multiple Access (TDMA) to schedule link activity (block 76). All communications are preferably performed within a designated time slot. One or more source and one or more destination devices may be scheduled to communicate in a given timeslot, and each timeslot may be dedicated to communication from a single source device or to a CSMA/CA-like shared communication access mode between multiple source devices. Source devices may send messages to specific target device or broadcast messages to all of the destination devices assigned to the slot.

To enhance reliability, the wireless HART protocol 70 may combine TDMA with a method of associating multiple radio frequencies with a single communication resource, or channel hopping. Channel hopping provides frequency diversity which minimizes interference and reduces multi-path fading effects. In particular, the data link 76 may create an association between a single superframe and multiple carrier frequencies which the data link 76 cycles through in a controlled predefined manner. For example, the available frequency band of a particular instance of the wireless HART network 14 may have carrier frequencies $F_1, F_2, \ldots F_n$. A relative frame R of a superframe S may be scheduled to occur at a frequency $F_1$ in the cycle $C_n$, at a frequency $F_5$ in the following cycle $C_{n+1}$, at a frequency $F_2$ in the cycle $C_{n+2}$, and so on. The network manager 27 may configure the relevant network devices with this information so that the network devices communicating in the superframe S may adjust the frequency of transmission or reception according to the current cycle of the superframe S.

The data link 76 of the wireless HART protocol 70 may offer an additional feature of channel blacklisting, or restricting the use of certain channels in the radio band by the network devices. The network manager 27 may blacklist a radio channel in response to detecting excessive interference or other problems on the channel. Further, operators or network administrators may blacklist channels in order to protect a wireless service that uses a fixed portion of the radio band that would otherwise be shared with the wireless HART network 14. In some embodiments, the wireless HART protocol 70 controls blacklisting on a superframe basis so that each superframe has a separate blacklist of prohibited channels.

In one embodiment, the network manager 27 is responsible for allocating, assigning, and adjusting time slot resources associated with the data link layer 76. If a single instance of the network manager 27 supports multiple wireless HART networks 14, the network manager 27 may create an overall schedule for each instance of the wireless HART network 14. The schedule may be organized into superframes containing time slots numbered relative to the start of the superframe. Additionally, the network manager 27 may maintain a global absolute slot count which may reflect the total of number of time slots scheduled since the start-up of the wireless HART network 14. This absolute slot count may be used for synchronization purposes.

The wireless HART protocol 70 may further define links or link objects in order to logically unite scheduling and routing. In particular, a link may be associated with a specific network device, a specific superframe, a relative slot number, one or more link options (transmit, receive, shared), and a link type (normal, advertising, discovery). As illustrated in FIG. 2, the data link 76 may be frequency-agile. More specifically, a channel offset may be used to calculate the specific radio frequency used to perform communications. The network manager 27 may define a set of links in view of the communication requirements at each network device. Each network device may then be configured with the defined set of links. The defined set of links may determine when the network device needs to wake up, and whether the network device should transmit, receive, or both transmit/receive upon waking up.

Other layers of the wireless HART protocol 70 are also illustrated in FIG. 2. Both the existing HART protocol 72 and the wireless HART protocol 70 are loosely organized around the well-known ISO/OSI 7-layer model for communications protocols. In the wireless expansion of HART technology, three physical layers and two data-link layers may be supported: the wired and the wireless mesh. Because the wireless HART protocol described herein allows deployment of mesh topologies, a significant network layer 78 may be specified as well.

As indicated above, a superframe may be understood as a collection of time slots repeating in time. The number of slots in a given superframe (superframe size) determines how often each slot repeats, thus setting a communication schedule for network devices that use the slots. Each superframe may be associated with a certain graph identifier corresponding to a routing graph included in a mesh topology. In some embodiments, the wireless HART network 14 may contain several concurrent superframes of different sizes. Moreover, a superframe may include multiple radio channels, or radio frequencies.

Further, the transport layer 80 of the wireless HART protocol 70 allows efficient, best-effort communication and reliable, end-end acknowledged communications. As one skilled in the art will recognize, best-effort communications allow devices to send data packets without an end-to-end acknowledgement and no guarantee of data ordering at the destination device. User Datagram Protocol (UDP) is one well-known example of this communication strategy. In the process control industry, this method may be useful for publishing process data. In particular, because devices propagate process data periodically, end-to-end acknowledgements and retries have limited utility, especially considering that new data is generated on a regular basis.

In contrast, reliable communications allow devices to send acknowledgement packets. In addition to guaranteeing data delivery, the transport layer 80 may order packets sent between network devices. This approach may be preferable for a request/response traffic or when transmitting event notifications. When the reliable mode of the transport layer 80 is used, the communication may become synchronous.

Reliable transactions may be modeled as a master issuing a request packet and one or more slaves replying with a response packet. For example, the master may generate a certain request and can broadcast the request to the entire network. In some embodiments, the network manager 27 may use reliable broadcast to tell each network device in the wireless HART network 14 to activate a new superframe. Alternatively, a field device such as the sensor 30 may generate a packet and propagate the request to another field device such as the portable HART communicator 55. As another example, an alarm or event generated by the 34 field device may be transmitted as a request directed to the gateway 22. In response to successfully receiving this request, the gateway 22 may generate a response packet and send it to the device 34 acknowledging receipt of the alarm notification.

Referring again to FIG. 2, the session layer 82 may provide session-based communications between network devices. End-to-end communications may be managed on the network layer by sessions. A network device may have more than one session defined for a given peer network device. It is contemplated that in some embodiments, almost all network devices may have at least two sessions established with the network manager 27: one for pair-wise communication and one for network broadcast communication from the network manager 27. Further, all network devices may have a gateway session key. The sessions may be distinguished by the network device addresses assigned to them. Each network device may keep track of security information (encryption keys, nonce counters) and transport information (reliable transport sequence numbers, retry counters, etc.) for each session in which the device participates.

Finally, both the wireless HART protocol 70 and the wired HART protocol 72 may support a common HART application layer 84. The application layer of the wireless HART protocol 70 may additionally include a sub-layer 86 supporting auto-segmented transfer of large data sets. By sharing the application layer 84, the protocols 70 and 72 allow for a common encapsulation of HART commands and data and eliminate the need for protocol translation in the uppermost layer of the protocol stack.

Returning to FIG. 1, in accordance with some of the embodiments discussed above, the network manager 27 may contain a list of all devices in the network 14. The network manager 27 may also contain the overall network topology including a complete graph of the network 14 and portions of the graph that have been communicated to each device. The network manager 27 may generate route and connection information using the information that the network manager 27 receives from the network devices 30-40, 50a, 50b, 60, 55, etc. The graph of the network may be built by the network manager 27 from the list of network devices and their reported neighbors. The network manager 27 may also be responsible for generating and maintaining all of the route information for the network. Further, there may be broadcast routes used to send broadcast messages from the network manager 27 to all of the devices of the network 14. Still further, the network manager 27 may also carry out the scheduling of network resources once the routing information and burst mode update rates of network devices 30-40, 50a, 50b, 60, 55, etc. are known.

As such, the graph routing generated and maintained by the network manager 27 may direct traffic both upstream and downstream with respect to the network manager 27 or gateway 22. Both graph and source routes may be optimized to satisfy applications with low latency requirements. For example, the graph and/or source route optimization may be based on measurement information that is transferred from network devices to the gateway and control information that is transferred from gateway devices to final control commands such as regulating valves, on-off valves, pumps, fans, dampers, as well as motors used in many other ways.

As indicated above, devices involved in routing store or obtain a different graph route, the source route, or to the address of the destination in order to deliver and properly relay data packets. The address of each network device must be globally unique in order for the wireless HART network 14 to properly co-operate with a larger network which may include wired HART devices. For this reason, the wireless HART protocol 70 may provide an unambiguous addressing scheme and additionally provides an efficient mapping of addresses to a larger network context. Importantly, the wireless HART protocol 70 may provide an addressing scheme compatible with the addressing scheme used with wired HART devices.

With regard to the scheduling of network resources by the network manager 27, a user or operator may specify, for each field device, the rate at which the device reports measurements or other data to another network device. This report rate is also interchangeably referred to herein as a "burst rate" or a "sample rate." In the example of the wireless HART network 14, each field device may report or publish data upstream to the gateway device 22, to the network manager 27 at the gateway device 22, or to another network device at a corresponding burst rate or sample rate. The burst rate or sample rate may be configured for each field device by the user, in an embodiment. The user may further specify or configure the power at which the physical or field device transmits radio signals.

A scheduler (not shown) may automatically generate one or more schedules according to the user-specified parameters and optimization rules. In an embodiment, the one or more generated schedules may include a master schedule corresponding to the entire network 14 and one or more individual schedules each corresponding to a different network device of the network 14. In an embodiment, the one or more individual schedules are included in the master schedule. The one or more individual schedules may be communicated to respective network devices (e.g., devices 30-40, 50a, 50b, 60, 55, etc.) of the wireless HART network 14 by the network manager 27. In an embodiment, the scheduler is included in the network manager 27. In an embodiment, the scheduler is external to and in communicative connection with the network manager 27, such as via the network 43 or the network 20. An example of a scheduler may be found in aforementioned U.S. patent application Ser. No. 12/201,734 filed on Aug. 29, 2008, the entire contents of which are hereby incorporated by reference.

Figure 3A:
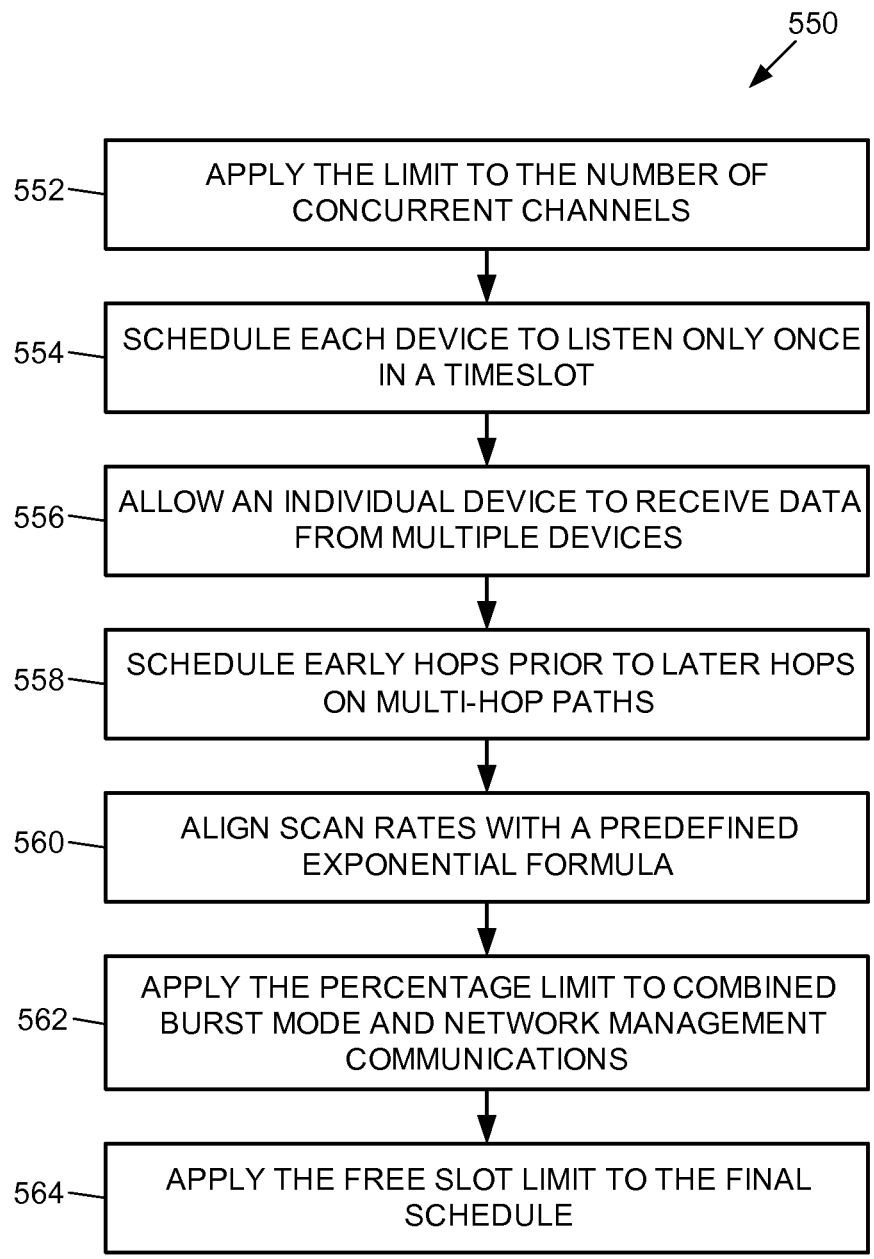
FIG. 3A illustrates an exemplary scheduling procedure responsible for design constraint enforcement.
Figure 3B:
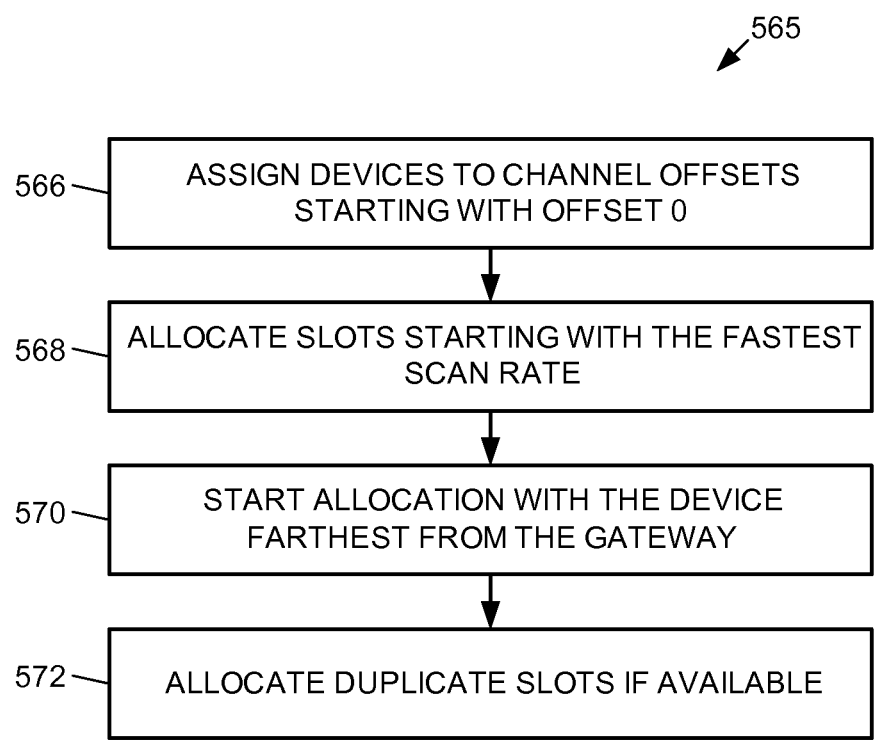
FIG. 3B illustrates an exemplary scheduling procedure responsible for data superframe configuration.
Figure 3C:
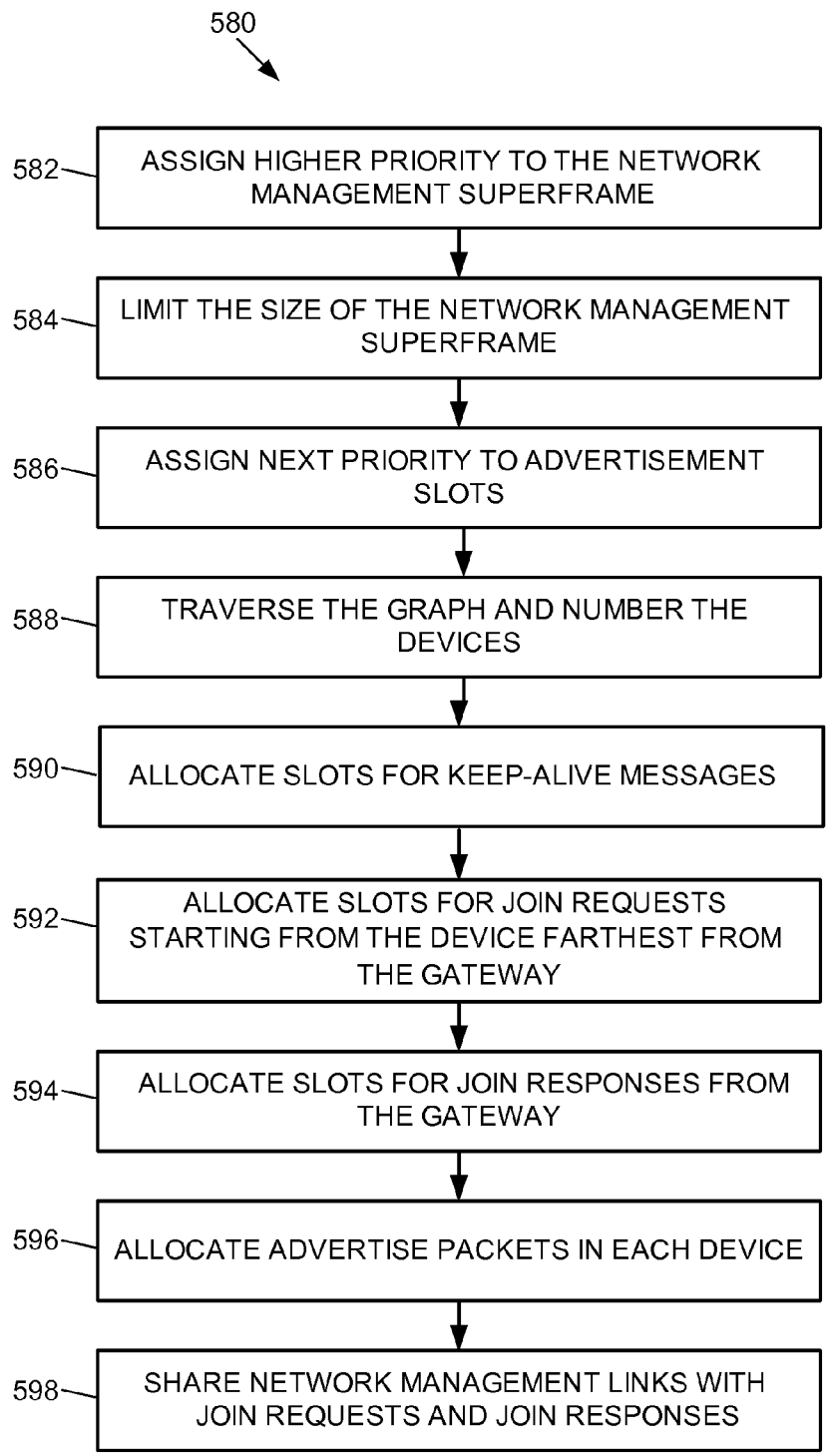
FIG. 3C illustrates an exemplary scheduling procedure responsible for management superframe configuration.

FIGS. 3A-3C illustrate several exemplary sequences of steps which the scheduler may carry out as part of generating and optimizing the master schedule of the wireless HART network 14. More specifically, the scheduler may include procedures responsible for constraint enforcement, data superframe configuration, network management configuration, gateway superframe configuration, and special purpose superframe configuration.

Turning to FIG. 3A, a procedure 550 may apply at least some of the principles 552-564 simultaneously or may alter the sequence of applying the principles 552-564 to a master schedule being developed. The procedure 550 is primarily responsible for enforcing various design constraints on each individual schedule as well as on the master schedule. In a block 552, the procedure 550 may apply the principle of limiting the number of concurrent channels. Of course, the number of concurrent channels is limited by the number of radio frequencies available to the wireless HART network 14. In one contemplated embodiment, the user may configure the limit via an interactive menu.

The procedure 550 may apply a principle 554, whereby no device may be scheduled to listen twice in the same time slot. In accordance to the principle 556, the procedure 550 may allow devices to receive data from multiple destinations.

While applying the principle 558, the procedure 550 may schedule early hops before later hops on a multi-hop network. In other words, the procedure 550 may attempt to minimize the latency on each multi-hop path by ensuring that each node has as many available timeslots as possible to forward a recently received data packet. For example, a node N1 may receive a packet for a node N2 in the timeslot with a relative number 5 in a 32-timeslot superframe. Thus, the node N1 may have 27 potential timeslots in the remaining part of the superframe. The scheduler may identify the next available timeslot within the superframe (such as 8, for example), and may schedule the transmission from N1 to N2 to occur in that slot.

In order to optimize the alignment of superframes, the scheduler may enforce the principle 560 requiring that all burst rates or sample rates and, therefore, superframe sizes, conform to a predefined formula. For example, the burst rates may be defined as $2^n$ seconds, where n is an integer. Thus, one network device may have a burst rate of $2^2$ or four times a second, and another device may have a burst rate of $2^3$ or once every 8 seconds. Further, the procedure 550 may ensure that the combined burst mode and network management communications do not exceed a predefined percentage of the total bandwidth available to the wireless HART network 14 (principle 562). In one contemplated embodiment, this predefined percentage is set at 30%. Similarly, the procedure 550 may ensure, in accordance with the principle 564, that none of the schedules exceeds a predefined ratio, such as 50%, of the total number of available timeslots. In this manner, the scheduler may attempt to reserve a sufficient number of free slots for such purposes as retries and other unplanned transmissions.

Referring now to FIG. 3B, the procedure 565, which is responsible for data superframe configuration, may apply a principle 566 and assign network devices to channel offsets starting with slot 0. Next, the procedure 565 may allocate timeslots starting with the fastest scan rate (block 568). By starting with the fastest scan rate, the scheduler may ensure that higher bandwidth demands are satisfied first because it is generally easier to find available timeslots for those devices which transmit infrequently and thus have lower scan rates.

For each path, the procedure 565 may start slot allocation from a device farthest from the gateway (block 570). In particular, the procedure 565 may allocate one slot on the path to the gateway device, move on to the next hop in the path, and continue slot allocation until reaching the gateway. Upon successfully allocating each individual slot, the procedure may also allocate the closest available slot for a potential retry.

Once the procedure 565 allocates the timeslots for one path between each network device (e.g., devices 30-40, 50a, 50b, 60, 55, etc.) and the gateway 22, the scheduler may additionally attempt to allocate timeslots on each duplicate path. A duplicate path may connect the same pair of devices as the primary path but is distinct from the primary path in at least one intermediate hop. The procedure 550 may attempt to allocate timeslots for the duplicate paths in a block 572.

FIG. 3C illustrates a procedure 580 which the scheduler may execute after or in parallel with the procedures 550 and 565. The procedure 580 is primarily responsible for management configuration. In particular, the procedure applies principles 582-590 to configure management superframes, principles 592-596 to configure the join process, and principle 598 to configure network management command propagation.

The principle 582 applied by the procedure 580 may ensure that the network management superframes have higher priority than data superframes. Next, the procedure 580 may limit the size of the network management superframe to a predefined number such as 6000 slots in accordance with the principle 584. Further, the scheduler 304 may assign the next priority to advertisement slots (principle 586). Devices may use advertisement slots to join the wireless HART network 14.

In a block 588, the procedure 580 may perform a breadth-first search of the network graph and number the devices in the order in which the devices are encountered. Of course, the search corresponding to the block 588 may be performed at any time after the potential wireless links are defined. In an embodiment, the procedure 580 may need to renumber devices whenever new devices are added to the network 14.

Next, the procedure 580 may allocate slots for keep-alive messages. In general, every network device preferably has a timeslot reserved for keep-alive transmission. If a neighbor of the device does not propagate information through the device within a predefined time interval (such as 60 seconds), the device may send a keep-alive packet to the neighbor in order to verify the operational state of the neighbor.

The procedure 580 may also configure the join process by allocating slots reserved for join requests in a block 592. For each path, the procedure 580 may start from the device farthest from the gateway and advance toward the gateway along the path. In some contemplated embodiments, the procedure 580 does not provide redundancy to join request time slots. Next, the procedure 580 may similarly allocate slots for join responses; however, the procedure may now start from the gateway and move in the direction of the device farthest from the gateway. The procedure 580 may then allocate advertise packets in each device in a block 596. In one contemplated embodiment, the number of advertise packets allocated to a particular device is inversely related to the number of hops separating the device from the gateway.

In accordance with a principle 598, the procedure 580 may configure sharing of network management links with join requests and join responses. This approach may allow the scheduler to use the same set of links for two distinct purposes.

Figure 4:
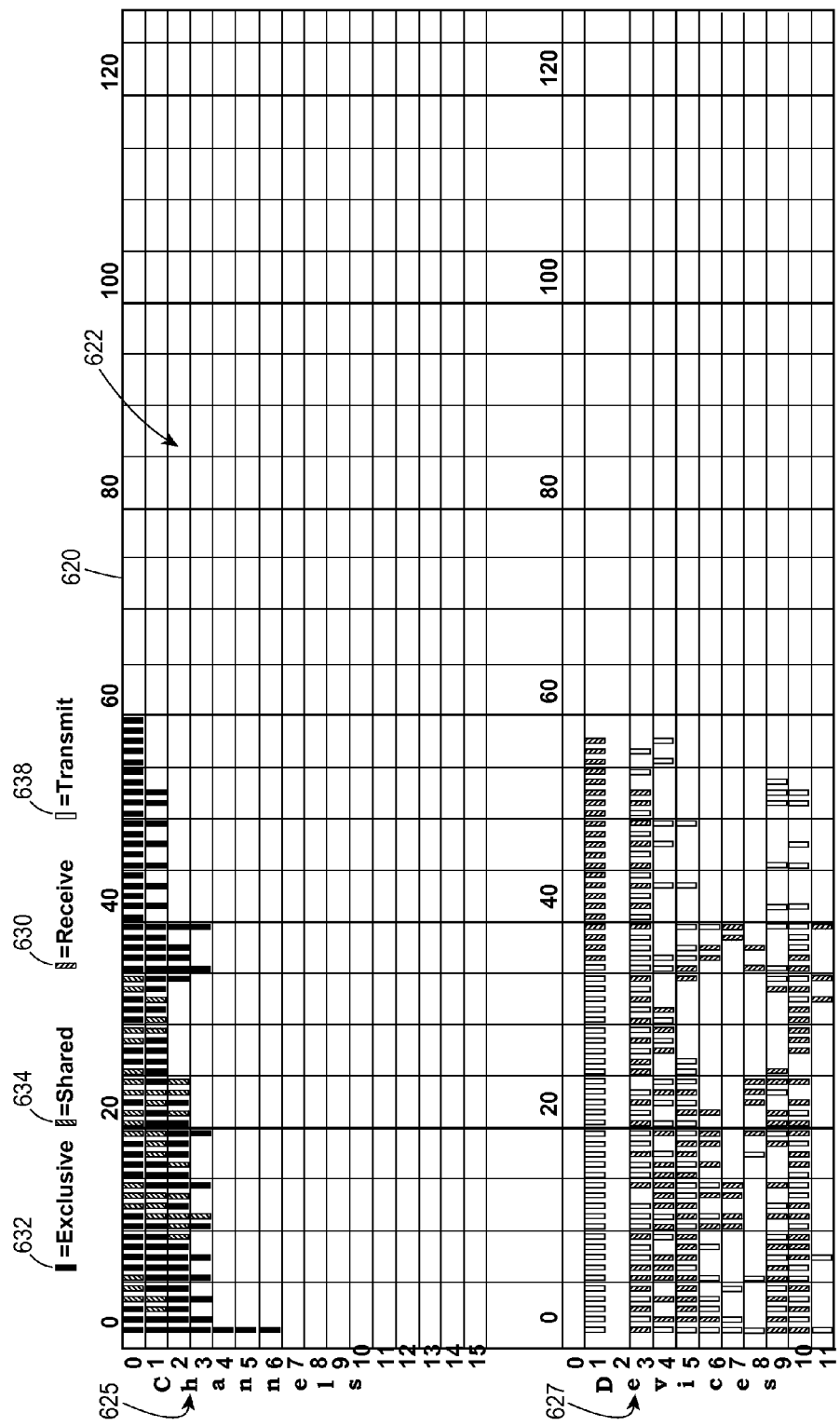
FIG. 4 is an exemplary graphical illustration of a schedule for the wireless HART network including time slot allocation, assignment, and other scheduling parameters.

The scheduler may generate a master schedule including the individual schedules of the devices of the wireless HART network 14 in accordance with the principles and strategies discussed above. FIG. 4 illustrates an exemplary schedule presented in a graph mode. The exemplary schedule may be displayed on a user interface in communicative connection with the process control system 10, in an embodiment. Individual schedules included in the master schedule may be communicated by the network manager 27 to the network devices (e.g., devices 30-40, 50a, 50b, 60, 55, etc.), in an embodiment.

In FIG. 4, a graphical chart 620 may include a time slot grid 622. In the exemplary embodiment depicted in FIG. 4, each vertical line of the grid 622 corresponds to 5 timeslots. A channel schedule listing 625 and a device schedule listing 627 may be disposed on the grid 622 in a horizontal direction. In other words, the partitioning of channels into timeslots and the association of devices with timeslots may be depicted on the chart 620 as a horizontal time progression, with vertical lines representing consecutive 5-slot intervals. Further, each individual channel and each individual device may have a separate horizontal strip unambiguously showing timeslot allocation for the individual channel or device.

A legend 630 may illustrate the association of time slot assignments with one or more colors. In the example illustrated in FIG. 4, the legend 630 illustrates that vertical bars of a color 632 represent timeslots reserved for exclusive use by a pair of devices and that vertical bars of color 634 represent timeslots allocated for shared use by multiple devices. The channel listing 625 includes blank spaces corresponding to unassigned timeslots and vertical bars of colors 632 and 634.

In the example illustrated in FIG. 4, the chart 620 indicates by means of blank spaces and colored bars that channel 3 is scheduled for shared transmission in timeslot 11 and for exclusive transmissions in timeslots 0, 1, 3, 5, 7, 10, 14, 19, 35, and 39, and that the rest of the timeslots on channel 3 are available.

On the other hand, the device schedule listing 627 includes, in addition to blank spaces similarly corresponding to unassigned timeslots, vertical bars of colors 636 and 638. According to the exemplary legend 630, vertical bars of color 636 represent timeslots reserved for reception and vertical bars of color 638 represent timeslots reserved for transmission. In the example illustrated in FIG. 4, the chart 620 indicates that the device 11 is scheduled for transmission in timeslots 0 and 7 and for reception in timeslots 32, 34, and 39. In an embodiment, the master schedule may be cyclical or may repeat periodically. For example, the timeslot allocations as shown for channels 625 and devices 627 between timeslots 0-60 may be repeated for timeslots 60-119, 120-179, 180-239, etc.

It is noted that FIG. 4 illustrates one of many possible embodiments for representing master and/or individual schedules. Examples of other embodiments may be found, for example, in U.S. patent application Ser. No. 12/201,734, the entire contents of which are hereby incorporated by reference.

As previously discussed, routing and scheduling information based on user input and optimization rules may be initially generated by the scheduler (e.g., as discussed with respect to FIGS. 3A-3C) and communicated to the network manager. The initial graphs and schedules, however, may be adjusted based on the feedback information regarding the performance of the wireless HART network 14. Additionally, the graphs and schedules may be adjusted due to changes in one or more user preferences, e.g., a removal or an addition of one or more network devices, user changes to various parameters, etc. Any adjustments to graphs and schedules may be communicated by the network manager 27 to network devices in the wireless HART network 14 that are impacted by the adjustments.

A network device (e.g., network device 30-40, 50a, 50b, 60, 55, etc.) may receive its corresponding individual schedule, for example, from the network manager 27. The individual schedule corresponding to the network device may include an indication of one or more timeslots during which the network device is allowed to publish or transmit information to the network 14 (referred to herein as "publishing timeslots"). For example, in FIG. 4, the device 11 is allocated publishing timeslots 0 and 7. The allocated or assigned publishing timeslots may re-occur in a cyclical or periodic manner, in an embodiment. For example, in FIG. 4, publishing timeslots 60 and 67 and publishing time slots 120 and 127 may also be allocated to the device 11.

During an allocated or assigned publishing timeslot, the network device may transmit or publish information or data corresponding to a process being controlled in the process control network 10. For example, a network device may publish an event corresponding to the process, a value of a measured variable or parameter corresponding to the process, a status, a measurement, a state, and/or other process control information. In an embodiment, the data published by the network device during a publishing timeslot may be generated by a field device, and the data may correspond to any type of monitoring or movement associated with the field device (e.g., an indication of a valve opening or closing, an amount of flow, a measurement, a change in state, etc.) In an embodiment, the data may be published by the network device to the gateway 22, to the network manager 27, and/or to another network device that is communicatively coupled to the network 14.

Currently known network devices are triggered to publish data or information in conjunction with the occurrence of a publishing timeslot. For example, when a publishing timeslot occurs, a currently known wireless network device is triggered to wake up a publishing module or routine (e.g., to exit the publishing module or routine out of a power-saving mode), read or obtain a current value, and publish the current value to the network. In current wireless HART networks, publishing timeslots that are allocated to a network device typically occur at a slower rate than update or burst rates of the network device. In particular, slower publishing rates are generally more desirable to conserve battery life of wireless network devices and to allow for greater numbers of devices to connect to the wireless network 14. However, with currently known network devices in process control systems, if an event occurs between allocated publishing timeslots, the network device is not able to publish the event and a record of the event's occurrence and any related data is lost to the process control system.

With the delayed publishing techniques of the present disclosure, however, a network device may delay publication of data or events to the network 14 until a publishing timeslot occurs. In particular, a network device (e.g., devices 30-40, 50a, 50b, 60, 55, etc.) may be configured to support any or all of the delayed publication techniques of the present disclosure. As such, a network device may store or cache process control data along with corresponding timestamps that indicate when the process control data was captured or obtained. When a next or subsequent publishing timeslot occurs, the network device may be triggered to publish at least a portion of the cached data and a respective timestamp to the network 14. Accordingly, the process control system 10 may be able to have knowledge of a more complete set of published data corresponding to events, measured values, states, and other process control data that have occurred, and not just those that happened to occur during publishing timeslots. The process control system 10 may utilize the more complete set of published data to produce a more complete view of the system, and thus the process control system may control processes in a more comprehensive and appropriate manner than a system without delayed publishing.

In an illustrative but non-limiting example, consider the wireless HART valve positioner network device 34 of FIG. 1. A trip of the valve positioner 34 to change a valve from an "opened" state to a "closed" state (and vice versa) generally occurs in about a second. However, a publish rate (e.g., update rate, sample rate or burst rate) of the valve positioner 34 may typically be on the order of several seconds, such as 8 seconds. Thus, it is possible that the state of the valve 34 may change (perhaps several times) between allocated publishing opportunities.

To illustrate, suppose the valve positioner 34 is allocated timeslots 0 and 10 for transmission or publication. In currently known systems, if the valve positioner 34 is at an open state during timeslot 0, the network device 34 publishes the "open" state to the network 14 during timeslot 0. If the valve positioner 34 moves to a "closed" state during timeslot 3 and then moves to an "open" state at timeslot 7, during the next, immediately subsequent allocated publication timeslot (i.e., timeslot 10), the network device 34 merely publishes the current "open" state to the network 14. Thus, in currently known systems, the network 14 does not receive any indication at all that the valve positioner 34 changed states between timeslots 0 and 10.

In contrast, by using the techniques of the present disclosure, such data may be easily captured and published to the network 14. For instance, with the present disclosure, when the valve positioner 34 moves to a "closed" state during timeslot 3, an indication of the change in state to "closed" and an indication of the timeslot 3 may be stored in an entry of the cache of the valve positioner network device 34. When the valve positioner 34 moves to an "open" state during timeslot 7, an indication of the change in state to "open" and an indication of the timeslot 7 may be stored in a different entry of cache of the valve positioner network device 34. Accordingly, when the next subsequent publishing timeslot allocated to the network device 34 occurs at timeslot 10, the network device 34 may be triggered to publish contents of an oldest entry in its cache (in this scenario, "state of valve 34 changed to "closed" during timeslot 3"). When yet another subsequent publishing timeslot allocated to the network device 34 occurs after the publishing timeslot 10, the network device 34 may be triggered to publish the next oldest entry in its cache (in this scenario, "state of valve 34 changed to "open" during timeslot 7"). As such, using the techniques of the present disclosure, the process control system 10 may not only capture information corresponding to changes of state of the valve 34 that occur between allocated publishing timeslots, but the process control system 10 may also be able to determine exactly when the changes of states occurred and exactly how long the valve 34 was in the "closed" state.

Although the previous example referred to a wireless HART valve positioner 34, the techniques of delayed publishing may easily be applied to any wireless or wired network device (e.g., network device 30-40, 50a, 50b, 60, 55, etc.) that is included in the network 14 and/or in the process control system 10. Further, although the previous example referred to an event that corresponded to a binary state (i.e., the valve 34 being in an "opened" or a "closed" state), any process control data may be published in a delayed manner by the network device, e.g., an event corresponding to a state from a set of more than two possible states, a measurement, a value of a parameter or variable, a measurement, a status, and the like.

Figure 5:
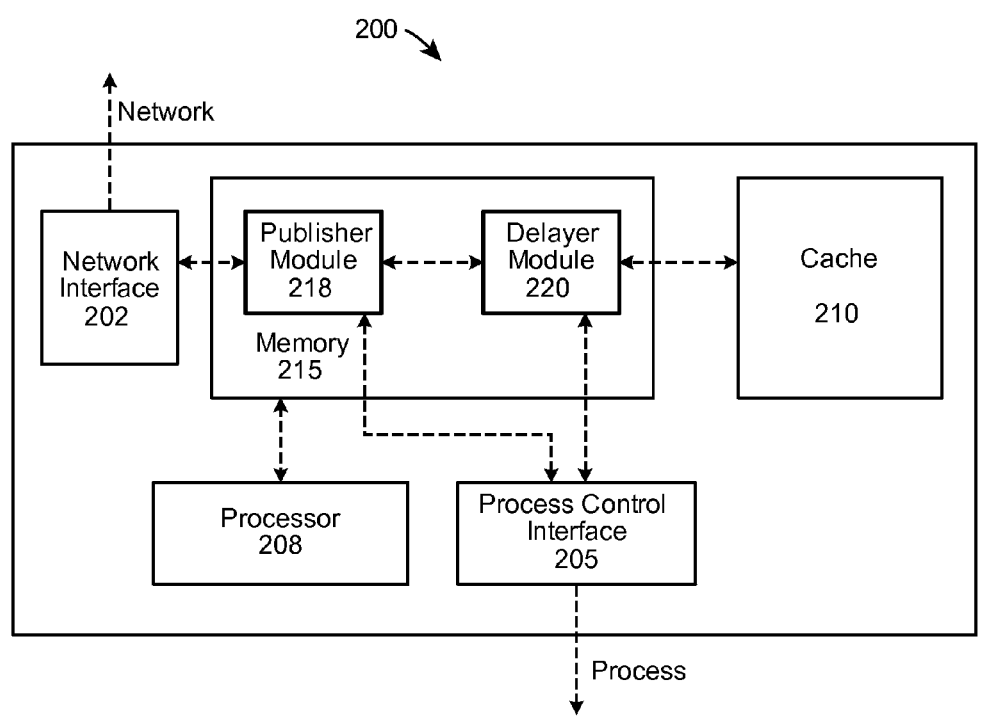
FIG. 5 depicts a block diagram of an example network device 200 configured to provide delayed publishing of process control data.

FIG. 5 depicts a block diagram of a network device 200 configured to provide delayed publishing of process control data. The network device 200 may be, for example, one of the network devices 30-40, 50a, 50b, 60, 55 illustrated in FIG. 1, or may be another network device. The network device 200 may operate in conjunction with embodiments of portions of the networks 10, 12 and/or 14 of FIG. 1, the protocols 70 and/or 72 of FIG. 2, and/or the scheduling procedures 550, 565 and 580 of FIGS. 3A-3C.

In an embodiment, the network device 200 may operate in a process control system, and the network device 200 may be communicatively coupled to a communications network included in the process control system, such as the wired and/or wireless HART communications network 14. As such, the network device 200 may include a network interface or connection 202 to the communications network via which information may be sent to and received from the communications network.

The network device 200 may include a process control interface 205 configured to obtain process control data corresponding to a process being controlled in the process control network. The process control data may include a value of a parameter or variable, a process control event, a measurement, a status, a state, or any other desired process control data. In an embodiment, the process control data is generated by a field device included with or in communicative connection with the network device 200. For example, if the network device 200 is a wireless HART valve positioner, the valve positioner may generate process control data corresponding to a state of the valve and provide the generated data to the process control interface 205. In another example, if the network device 200 is wireless adaptor in connection with a flow meter, the flow meter may generate process control data corresponding to a current measured flow and provide the generated data to the network device 200 via the process control interface 205.

The network device 200 may include a processor 208 for executing computer-executable instructions, a cache 210 and a memory 215. The memory 215 may be a tangible, non-transitory memory, and may include one or more computer-readable storage media. The memory 215 may be implemented as one or more semiconductor memories, magnetically readable memories, optically readable memories, and/or any other suitable tangible, non-transitory computer-readable storage media.

In an embodiment, the memory 215 may include a publisher module 218 and a delayer module 220 stored thereon. The publisher 218 may include a first set of computer-executable instructions that are executable by the processor 208 to publish data obtained by the network device 200 to the network 14, and the delayer 220 may include a second set of computer-executable instructions that are executable by the processor 208 to delay publication of data to the network 14. In an embodiment, the publisher 218 and the delayer 200 may be combined into a common module or a common set of computer-executable instructions.

In an embodiment, the cache 210 may include a random-access memory (RAM) for temporarily storing data related to the instructions 218, 220. The cache 210 may be included in the memory 215, in an embodiment. In an embodiment, a size of the cache 210 may be selectable or configurable.

With regard to the publisher 218, the computer-executable instructions may be executable by the processor 208 to receive an indication of a publishing timeslot allocated or assigned to the network device 200. In an embodiment, the one or publishing timeslots allocated to the network device 200 may be in accordance with an individual schedule of the network device 200 received from a network manager 27. The publishing timeslots may include publishing opportunities during which the network device 200 is allowed to transmit or publish data, such as process control data.

In an embodiment, the network device 200 may be configured to operate in multiple modes, such as a first immediate publishing mode and a second delayed publishing mode. The mode of operation of the network device 200 may be configured, for example, by an operator or a user. While operating in the first immediate publishing mode, during a publishing timeslot the network device 200 and/or the publisher 218 may publish a current value of the process control data obtained during the publishing timeslot. For example, when a publishing timeslot occurs, the network device 200 may be triggered to obtain a current value of the process control data via the process control interface 205, and the publisher 218 may publish the current value to the network 14 via the network interface 202. As such, while operating in the immediate publishing mode, the network device 200 may behave in a manner similar to currently known network devices that are only able to perform immediate publishing of data.

While operating in the second delayed publishing mode, however, when a publishing timeslot occurs, the network device 200 and/or the publisher 218 may be triggered to publish previously stored process control data. In particular, the network device 200 and/or the publisher 218 may be triggered to publish at least a portion of the contents of an entry stored in the cache 210. The entry may include a value of process control data that was obtained prior to the occurrence of the publishing timeslot and a timestamp indicating an instance of time at which the value was obtained. Both the value of the process control data and the timestamp stored in the entry may be published to the network 14 via the network interface 202.

Generally, the cache 210 may written to and read from while the network device 200 is operating in the delayed publishing mode. The cache 210 may store one or more entries, and each entry may correspond to a different instance in time at which a respective value of the process control data was captured or obtained at the process control interface 205. If a particular entry is stored in the cache 210 but has not been published, the particular entry may be so marked. For example, the particular entry may be marked as "to be published" or "active." After publication, the particular entry may be marked as already published, e.g., "already published," "deactivated" or "inactive." In an embodiment, a published entry may be removed, deleted or overwritten.

With regard to the delayer 220, the computer-executable instructions may be executable by the processor 208 to write to and read from the cache 210, in an embodiment. For example, the delayer 220 may write values of process control data obtained via the process control interface 205 and respective timestamps to different entries of the cache 210 as the values are obtained. While the network device 200 is operating in the delayed publishing mode, when a trigger to publish occurs, the delayer 220 may obtain contents of an entry from the cache 210 to provide to the publisher 218 for publishing to the network 14. Additionally, the delayer 220 may be configured to administrate which entries of the cache 210 have or have not been published to the network 14.

In an embodiment, the entries in the cache 210 may correspond to a sample rate or burst rate corresponding to the network device 200. For example, if the network device 200 is a wireless HART field device and the sample or burst rate of the wireless HART field device is configured to be 12 seconds, then every 12 seconds a current value corresponding to the field device may be captured at the process control interface 205 and may be stored in a different entry of the cache 210 along with a respective timestamp. In another example, if the network device 200 is a wireless HART adaptor coupled to a wired field device and the sample or burst rate of the wired device is configured to be 5 seconds, then every 5 seconds a current value corresponding to the wired field device may be captured at the network device 200 from the wired field device via the process control interface 205 and may be stored in a different entry of the cache 210 along with a respective timestamp.

In an embodiment, while the network device 200 is operating in the second delayed publishing mode and when a publishing timeslot occurs, the delayer 220 may determine an oldest active entry in the cache 210, and may direct the publisher 218 to publish the contents of the oldest active entry (e.g., the value of the process control data and the respective timestamp) to the network 14. After publishing the oldest active entry, the published entry may be deactivated by the delayer 220. For example, the published entry may be removed, deleted or overwritten. In this embodiment, captured process control data may be published in a delayed, FIFO (first in first out) manner to the network 14.

In an embodiment, while the network device 200 is operating in the second delayed publishing mode and when a publishing timeslot occurs, the cached data may be published not by using a FIFO algorithm but by using any other desired algorithm. For example, if immediate bandwidth is of concern when a publishing timeslot occurs, the delayer 220 may select a shorter entry in the cache 210 for publication by the publisher 218. After publishing the contents of a selected entry (e.g., the value of the process control data and the respective timestamp), the published entry may be deactivated. For example, the published entry may be removed, deleted or overwritten. In this embodiment, the entries of the cache 210 are not published in a sequential order of occurrence. Nonetheless, the process control system 10 (and the network manager 27) may recreate the sequential order based on the published timestamps.

In an embodiment, the delayed publishing of entries of the cache 210 may not be triggered by an occurrence of a publishing timeslot. For example, an entry of the cache 210 may be triggered to be published upon user demand, or may be triggered to be published based on any desired event.

Thus, while operating in the delayed publishing mode, the network device 200 may cache obtained process control data and publish the cached data during subsequently available publishing timeslots. The delayed publishing mode may allow a user or operator of the process control system 10 to configure a quicker sample rate for a particular network device 200 while maintaining a relatively slower publish rate for the particular network device 200. In this manner, more network devices may be included on the network 14 (as afforded by to the slower publish rate) while maintaining a comprehensive, complete record of published events and other process data (as afforded by the faster sample rate).

Figure 6:
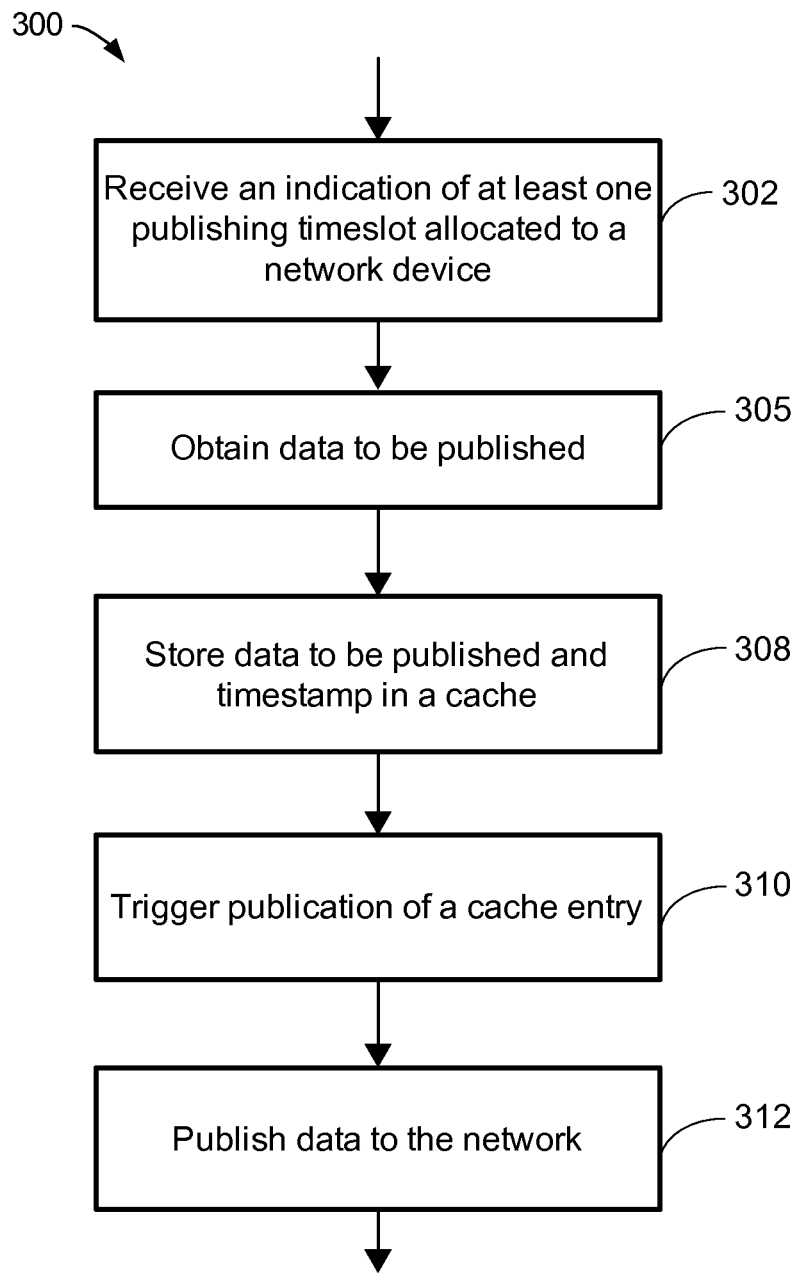
FIG. 6 is an example method of delaying publication of data by a network device in a process control system.

FIG. 6 is an example method 300 of delaying publication of data by a network device in a process control system. The method 300 may be used in conjunction, for example, with embodiments of the network device 200 of FIG. 5, the networks 10, 12 and/or 14 of FIG. 1, the protocols 70 and/or 72 of FIG. 2, and/or the scheduling procedures 550, 565 and 580 of FIGS. 3A-3C.

At a block 302, an indication of a publishing timeslot that is allocated or assigned to a network device may be received at the network device. The indication of the publishing timeslot may be received from a network manager of the communications network, in an embodiment. The network device may be, for example, a network device coupled to a communications network in a process control system. The network device may include a field device corresponding to a process being controlled by the process control system, or the network device may be coupled to the field device. In an embodiment, a plurality of publishing timeslots allocated or assigned to the network device may be received. The plurality of timeslots may be cyclical or may repeat in a periodic manner.

At a block 305, the network device may obtain data to be published to the network. In an embodiment, the data to be published to the network may correspond to process control data used in controlling the process, such as an event, a measurement, a value of a parameter or variable, a state, a status, or any other desired process control data. The data to be published may be generated by the field device, in an embodiment, and the data to be published may be obtained (block 305) based on a sample rate or a burst rate corresponding to the network device or to the field device. In an embodiment, multiple values of the data to be published may be obtained (block 305) over time.

In an embodiment, the data to be published may be obtained (block 305) independently and irrespective of occurrences of published timeslots corresponding to the network device. As such, the data to be published may be obtained (block 305) after an occurrence of a first publishing timeslot allocated to the network device and prior to an occurrence of an immediately subsequent publishing timeslot allocated to the network device. For example, when the sample rate of the network or field device is greater than periodically occurring publishing timeslots assigned to the network device, the process control data may be obtained (block 305) between subsequently occurring publishing timeslots.

At a block 308, the obtained data to be published may be stored in an entry of a cache along with an indication of when the data to be published was captured (e.g., a timestamp). The cache may be included in the network device. In an embodiment, the data to be published and its respective timestamp may be stored in the entry of the cache. In embodiments where multiple values of the data to be published are obtained over time (block 305), each value may be stored, along with its respective timestamp, in a different entry of the cache.

At a block 310, a publication of data corresponding to the process and stored in the cache may be triggered. Triggering the publication of data corresponding to the process and stored in the cache may include selecting or determining an entry of the cache for publication. In an embodiment, the selected entry is an oldest entry of the cache.

At a block 312, the contents of the selected entry (e.g., the value of the data corresponding to the process and the timestamp included in the selected entry) may be published to the network. The contents of the selected entry may be published or transmitted (block 312) to a network manager of the network, in an embodiment.

In an embodiment, triggering the publication of the data (block 310) and publishing the data to the network (block 312) are performed during a publication timeslot, so that the entry is selected and its contents are published during the publication timeslot.

In an embodiment, the blocks 308 and 310 are performed while the network device is operating in a delayed publishing mode. While the network device is operating in the delayed publishing mode, the data published to the network (block 312) may include the data from the cache entry selected at the block 310.

While the network device is not operating in a delayed publishing mode, the blocks 308 and 310 may be omitted. In particular, while the network device is not operating in the delayed publishing mode, the data to be published may be obtained (block 305) and immediately published to the network (block 312) during the occurrence of a publishing timeslot.

In an embodiment, the method 300 may include configuring the network device to operate in the delayed publishing mode, or configuring the network device to not operate in the delayed publishing mode, e.g., to operate in an immediate publishing mode.

While the embodiments of the present disclosure have been discussed with respect to a wireless HART network 14, the techniques described herein may easily be applied to a wired HART network. For example, if the network device 200 is a wired HART device, obtained process control data may be stored in the cache 210 along with respective timestamps, and the publisher 218 may be triggered to publish one or more entries from the cache 210 when a publishing opportunity occurs (for example, when the wired HART device has a token that allows it a publishing opportunity), upon demand, or at any other desired time.

Although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

A network device communicatively coupled to a process control system, comprising:
 a connection to a network included in the process control system;
 a publisher configured to publish data to the network of the process control system during a publishing timeslot allocated to the network device, wherein the data corresponds to a process controlled in the process control system; and
 a cache storing one or more entries, each entry of the one or more entries including a value of the data corresponding to the process and a respective timestamp,
 wherein the publisher is triggered to publish, to the network via the connection and during the publishing timeslot, contents of a particular entry of the cache that includes a particular timestamp corresponding to an instance in time that occurred prior to the publishing timeslot.

The network device of the preceding aspect, wherein the one or more entries of the cache correspond to a sample rate of the network device.

The network device of any of the preceding aspects, wherein the sample rate is configurable.

The network device of any of the preceding aspects, wherein the publishing timeslot is included in a plurality of publishing timeslots allocated to the network device, and wherein at least one entry of the cache includes a respective timestamp indicating an instance in time that occurred after an occurrence of a first publishing timeslot and before an occurrence of a second publishing timeslot immediately subsequent to the first publishing timeslot.

The network device of any of the preceding aspects, wherein the network supports a HART protocol.

The network device of any of the preceding aspects, wherein the HART protocol is a wireless HART protocol.

The network device of any of the preceding aspects, wherein the data corresponding to the process corresponds to a process control event.

The network device of any of the preceding aspects, wherein the process control event corresponds to a particular state, the particular state included in a set of two or more states.

The network device of any of the preceding aspects, wherein the publishing timeslot allocated to the network device is indicated by a network manager coupled to the network, and wherein the publisher is triggered to publish the contents of the entry to the network manager via the network.

The network device of any of the preceding aspects, wherein the entry stored in the cache is an oldest active entry stored in the cache, the oldest active entry is determined based on the timestamp included in the oldest active entry, and the oldest active entry is deactivated after publishing.

A method of delaying publication of data by a network device in a process control system, the network device including any of the preceding aspects, and the method comprising:
 receiving, at a network device coupled to a network included in the process control system, an indication of a publishing timeslot assigned to the network device;
 independent of an occurrence of the publishing timeslot, obtaining, at the network device, data to be published to the network, the data corresponding to a process being controlled in the process control system;
 storing, in an entry of a cache of the network device, the data to be published to the network and a timestamp corresponding to the data;
 triggering a publication of the data corresponding to the process, including determining an oldest entry of the cache; and
 publishing, by the network device, contents of the oldest entry of the cache to the network.

The method of the preceding aspect, wherein obtaining the data corresponding to the process comprises at least one of: obtaining data corresponding to an event associated with the process, or obtaining a value of a parameter associated with the process.

The method of any of the preceding aspects, wherein obtaining the data to be published to the network comprises obtaining multiple values over time of the data to be published to the network in accordance with a sample rate corresponding to the network device, and storing, in the entry of the cache, the data to be published to the network and the timestamp corresponding to the data comprises storing, in a different entry of the cache, each value of the multiple values of the data and a timestamp corresponding to the each value.

The method of any of the preceding aspects, further comprising configuring the sample rate corresponding to the network device.

The method of any of the preceding aspects, wherein obtaining the data to be published to the network comprises obtaining the data to be published to the network in accordance with a sample rate corresponding to the network device, and a rate of re-occurrence of the publishing timeslot is less than the sample rate corresponding to the network device.

The method of any of the preceding aspects, wherein the network is a wireless HART network, and wherein publishing the contents of the oldest entry of the cache to the network comprises transmitting, using a wireless HART protocol, the contents of the oldest entry of the cache to a network manager coupled to the network.

The method of any of the preceding aspects, wherein:
 the network device is operable in a first mode and in a second mode;
 when the network device is operating in the first mode, triggering the publication of the data corresponding to the process comprises triggering the publication of the data corresponding to the process during the publishing timeslot, and publishing the contents of the oldest entry of the cache to the network comprises publishing the contents of the oldest entry of the cache to the network during the publishing timeslot; and
 when the network device is operating in the second mode, triggering the publication of data corresponding to the process forgoes determining the oldest entry of the cache, forgoes publishing the contents of the oldest entry of the cache to the network, and includes determining a current value of the data corresponding to the process and publishing the current value of the data corresponding to the process to the network during the publishing timeslot.

The method of any of the preceding aspects, further comprising at least one of configuring the network device to operate in the first mode, or configuring the network device to operate in the second mode.

The method of any of the preceding aspects, wherein:
 triggering the publication of the data corresponding to the process comprises triggering the publication of the data corresponding to the process during the publishing timeslot, and publishing, by the network device, the contents of the oldest entry of the cache to the network comprises publishing, by the network device, the contents of the oldest entry of the cache to the network during the publishing timeslot.

A network device of any of the preceding aspects operating in a process control system, comprising a processor; a cache; a network interface coupling the network device to a communications network included in the process control system; a process control interface configured to obtain values of a parameter corresponding to a process control function; a tangible, non-transitory memory having instructions stored thereon that are executable by the processor to: receive an indication of a publishing timeslot allocated to the network device; when the network device is operating in a first mode: during the publishing timeslot, obtain, via the process control interface, a current value of the parameter corresponding to the process control function, and publish, to the communications network via the network interface, the current value of the parameter; and when the network device is operating in a second mode: publish, during the publishing timeslot to the communications network via the network interface, contents of an oldest active entry stored in the cache, the contents of the oldest active entry including a previously obtained value of the parameter corresponding to the process control function, wherein the previously obtained value was obtained at an instance in time occurring prior to the publishing timeslot; and deactivate the oldest active entry after publishing the oldest active entry.

The network device of any of the preceding aspects, wherein the instructions are further executable by the processor to store each value of the values of the parameter corresponding to the process control function in a different entry of the cache; and store a timestamp corresponding to the each value in the different entry of the cache.

The network device of any of the preceding aspects, wherein the values of the parameter received by the process control interface are obtained based on a sample rate of the network device, at least one value of the parameter is obtained at the process control interface of the network device prior to an occurrence of a next publishing timeslot allocated to the network device, and the instructions are further executable by the processor to store each at least one value of the parameter and a respective timestamp in a respective entry of the cache when the network device is operating in the second mode.

The network device of any of the preceding aspects, wherein the values of the parameter corresponding to the process control function are generated by a field device.

The network device of any of the preceding aspects, wherein the communications network is a wireless HART communications network.

What is claimed:

1. A network device communicatively coupled to a process control system, comprising:
   a connection to a network included in the process control system;
   a publisher configured to publish data to the network of the process control system during a publishing timeslot allocated to the network device, wherein the data corresponds to a process controlled in the process control system, the data is obtained in accordance with a sample rate corresponding to the network device, and a rate of re-occurrence of the publishing timeslot is less than the sample rate corresponding to the network device; and
   a cache storing one or more entries, each entry of the one or more entries including a value of the data corresponding to the process and a respective timestamp,
   wherein the publisher is triggered to publish, to the network via the connection and during the publishing timeslot, contents of a particular entry of the cache that includes a particular timestamp corresponding to an instance in time that occurred prior to the publishing timeslot.

2. The network device of claim 1, wherein the one or more entries of the cache correspond to the sample rate of the network device.

3. The network device of claim 2, wherein the sample rate is configurable.

4. The network device of claim 1, wherein the publishing timeslot is included in a plurality of publishing timeslots allocated to the network device, and wherein at least one entry of the cache includes a respective timestamp indicating an instance in time that occurred after an occurrence of a first publishing timeslot and before an occurrence of a second publishing timeslot immediately subsequent to the first publishing timeslot.

5. The network device of claim 1, wherein the network supports a HART protocol.

6. The network device of claim 5, wherein the HART protocol is a wireless HART protocol.

7. The network device of claim 1, wherein the data corresponding to the process corresponds to a process control event.

8. The network device of claim 7, wherein the process control event corresponds to a particular state, the particular state included in a set of two or more states.

9. The network device of claim 1, wherein the publishing timeslot allocated to the network device is indicated by a network manager coupled to the network, and wherein the publisher is triggered to publish the contents of the particular entry to the network manager via the network.

10. The network device of claim 1, wherein:
    the entry stored in the cache is an oldest active entry stored in the cache,
    the oldest active entry is determined based on the respective timestamp included in the oldest active entry, and
    the oldest active entry is deactivated after publishing.

11. A method of delaying publication of data by a network device in a process control system, comprising:
    receiving, at the network device coupled to a network included in the process control system, an indication of a publishing timeslot assigned to the network device;
    independent of an occurrence of the publishing timeslot, obtaining, at the network device, data to be published to the network in accordance with a sample rate corresponding to the network device, the data corresponding to a process being controlled in the process control system, and a rate of re-occurrence of the publishing timeslot being less than the sample rate corresponding to the network device;
    storing, in an entry of a cache of the network device, the data to be published to the network and a timestamp corresponding to the data;
    triggering a publication of the data corresponding to the process, including determining an oldest entry of the cache; and
    publishing, by the network device, contents of the oldest entry of the cache to the network.

12. The method of claim 11, wherein obtaining the data corresponding to the process comprises at least one of: obtaining data corresponding to an event associated with the process, or obtaining a value of a parameter associated with the process.

13. The method of claim 11, wherein the network is a wireless HART network, and wherein publishing the contents of the oldest entry of the cache to the network comprises transmitting, using a wireless HART protocol, the contents of the oldest entry of the cache to a network manager coupled to the network.

14. The method of claim 11, wherein:
triggering the publication of the data corresponding to the process comprises triggering the publication of the data corresponding to the process during the publishing timeslot, and
publishing, by the network device, the contents of the oldest entry of the cache to the network comprises publishing, by the network device, the contents of the oldest entry of the cache to the network during the publishing timeslot.

15. The method of claim 11, further comprising configuring the sample rate corresponding to the network device.

16. A method of delaying publication of data by a network device in a process control system, comprising:
receiving, at the network device coupled to a network included in the process control system, an indication of a publishing timeslot assigned to the network device;
independent of an occurrence of the publishing timeslot, obtaining, at the network device, multiple values over time of data to be published to the network in accordance with a sample rate corresponding to the network device, the data to be published to the network corresponding to a process being controlled in the process control system;
storing, in a different entry of a cache, each value of the multiple values of the data and a timestamp corresponding to the each value;
triggering a publication of the data corresponding to the process, including determining an oldest entry of the cache; and
publishing, by the network device, contents of the oldest entry of the cache to the network.

17. The method of claim 16, further comprising configuring the sample rate corresponding to the network device.

18. The method of claim 16, wherein obtaining the data corresponding to the process comprises at least one of: obtaining data corresponding to an event associated with the process, or obtaining a value of a parameter associated with the process.

19. The method of claim 16, wherein the network is a wireless HART network, and wherein publishing the contents of the oldest entry of the cache to the network comprises transmitting, using a wireless HART protocol, the contents of the oldest entry of the cache to a network manager coupled to the network.

20. The method of claim 16,
triggering the publication of the data corresponding to the process comprises triggering the publication of the data corresponding to the process during the publishing timeslot, and
publishing, by the network device, the contents of the oldest entry of the cache to the network comprises publishing, by the network device, the contents of the oldest entry of the cache to the network during the publishing timeslot.

21. A method of delaying publication of data by a network device in a process control system, comprising:
receiving, at the network device coupled to a network included in the process control system and operable in a first mode and a second mode, an indication of a publishing timeslot assigned to the network device;
independent of an occurrence of the publishing timeslot, obtaining, at the network device, data to be published to the network, the data corresponding to a process being controlled in the process control system;
storing, in an entry of a cache of the network device, the data to be published to the network and a timestamp corresponding to the data;
when the network device is operating in the first mode, triggering a publication of the data corresponding to the process during the publishing timeslot, including:
determining an oldest entry of the cache, and
publishing, by the network device, contents of the oldest entry of the cache to the network during the publishing timeslot; and
when the network device is operating in the second mode, triggering the publication of the data corresponding to the process, including:
forgoing determining the oldest entry of the cache,
forgoing publishing the contents of the oldest entry of the cache to the network, and
determining a current value of the data corresponding to the process and publishing the current value of the data corresponding to the process to the network during the publishing timeslot.

22. The method of claim 21, further comprising at least one of configuring the network device to operate in the first mode, or configuring the network device to operate in the second mode.

23. The method of claim 21, wherein obtaining the data corresponding to the process comprises at least one of: obtaining data corresponding to an event associated with the process, or obtaining a value of a parameter associated with the process.

24. The method of claim 21, wherein the network is a wireless HART network, and wherein publishing the contents of the oldest entry of the cache to the network comprises transmitting, using a wireless HART protocol, the contents of the oldest entry of the cache to a network manager coupled to the network.

25. The method of claim 21, further comprising configuring the sample rate corresponding to the network device.

26. A network device operating in a process control system, comprising:
a processor;
a cache;
a network interface coupling the network device to a communications network included in the process control system;
a process control interface configured to obtain values of a parameter corresponding to a process control function;
a tangible, non-transitory memory having instructions stored thereon that are executable by the processor to:
receive an indication of a publishing timeslot allocated to the network device;
when the network device is operating in a first mode, during the publishing timeslot:
obtain, via the process control interface, a current value of the parameter corresponding to the process control function, and
publish, to the communications network via the network interface, the current value of the parameter; and
when the network device is operating in a second mode, publish, during the publishing timeslot to the communications network via the network interface, contents of an oldest active entry stored in the cache, the contents of the oldest active entry including a previously obtained value of the parameter corresponding to the process control function, wherein the previously obtained value was obtained at an instance in time occurring prior to the publishing timeslot; and deactivate the oldest active entry after publishing the oldest active entry.

27. The network device of claim 26, wherein the instructions are further executable by the processor to:

store each value of the values of the parameter corresponding to the process control function in a different entry of the cache; and store a timestamp corresponding to the each value in the different entry of the cache.

28. The network device of claim 27, wherein:

the values of the parameter received by the process control interface are obtained based on a sample rate of the network device, at least one value of the parameter is obtained at the process control interface of the network device prior to an occurrence of a next publishing timeslot allocated to the network device, and the instructions are further executable by the processor to store each at least one value of the parameter and a respective timestamp in a respective entry of the cache when the network device is operating in the second mode.

29. The network device of claim 26, wherein the values of the parameter corresponding to the process control function are generated by a field device.

30. The network device of claim 26, wherein the communications network is a wireless HART communications network.

* * * * *

UNITED STATES PATENT AND TRADEMARK OFFICE
CERTIFICATE OF CORRECTION

Page 1 of 1

PATENT NO. : 9,002,973 B2
APPLICATION NO. : 13/653489
DATED : April 7, 2015
INVENTOR(S) : Mitchell S. Panther It is certified that error appears in the above-identified patent and that said Letters Patent is hereby corrected as shown below:

In the Specification:

At Column 4, line 55, "Stand alone" should be -- Standalone --.

Signed and Sealed this
Twenty-second Day of March, 2016

Michelle K. Lee
*Director of the United States Patent and Trademark Office*